(12) United States Patent
Davis et al.

(10) Patent No.: US 12,061,678 B2
(45) Date of Patent: Aug. 13, 2024

(54) SYSTEM AND METHOD FOR WATERMARKING A MACHINE LEARNING MODEL

(71) Applicant: Booz Allen Hamilton Inc., McLean, VA (US)

(72) Inventors: Clayton Davis, Collierville, TN (US); Saumil Dave, San Diego, CA (US); Baruch Gutow, Baltimore, MD (US); Gabriella Melki, Richmond, VA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 158 days.

(21) Appl. No.: 17/494,317

(22) Filed: Oct. 5, 2021

(65) Prior Publication Data
US 2023/0105309 A1 Apr. 6, 2023

(51) Int. Cl.
*G06F 21/16* (2013.01)

(52) U.S. Cl.
CPC .................. *G06F 21/16* (2013.01)

(58) Field of Classification Search
CPC .................. G06F 21/16; H04L 9/0894; H04L 2209/608
See application file for complete search history.

(56) References Cited

U.S. PATENT DOCUMENTS

| | | | |
|---|---|---|---|
| 2006/0190724 A1* | 8/2006 | Adams | G06F 21/6218 713/166 |
| 2017/0206449 A1* | 7/2017 | Lain | G06N 3/02 |
| 2019/0205508 A1* | 7/2019 | Poddar | G06N 3/045 |
| 2021/0144274 A1* | 5/2021 | Sanguinetti | H04N 19/40 |

OTHER PUBLICATIONS

Hul Xu et al., "Identifying Important Nodes in Complex Networks Based on Multiattribute Evaluation", Mathematical Problems in Engineering, vol. 2018, Article ID 8268436, 11 pp., Published May 31, 2018.

* cited by examiner

*Primary Examiner* — Henry Tsang
(74) *Attorney, Agent, or Firm* — Buchanan Ingersoll & Rooney PC

(57) ABSTRACT

Exemplary systems and methods are directed to embedding data into a machine learning model. A processing device executes program code for running a machine learning model, which has a plurality of parameter values. The processing device receives a message to be embedded into the machine learning model. The message is encrypted according to a set of keys of a cryptographic algorithm. The encrypted message is converted to a corresponding binary representation. The binary representation of the encrypted message is embedded into at least one of the one or more parameters of the machine learning model. The embedding operation modifies the at least one parameter value of the machine learning model.

18 Claims, 7 Drawing Sheets

FIG. 3A

```
302  function IdentifyMaximalNoninterferingBitIndex( n, T, E, F, test_data):
        mnb_index = -1
304     L = 0
        R = n - 1
308     while L <= R:
            c = floor((L + R) / 2)
310         e_index = 0
            altered_parameters = list[]
312         for index, parameter in enumerate(F):
                altered_parameters.append(parameter)
                altered_parameters[-1].precision_bits[c] = E[ e_index % len(E) ]
                altered_parameters[-1].precision_bits[c+1:n] = random[c+1:n]
                e_index +=1
            Fc = F
            Fc.parameter = altered_parameters
            if PerformanceEvaluation(Fc.predict(test_data)) <= T:
                mnb_index = c
                R = c-1
            else:
                L = c+1
        return mnb_index
```

300

```
function CreateEmbeddedMessageModel(E,F, mnb_index):
    for e_index, parameter in enumerate(F):
        altered_parameters.append(parameter)
        altered_parameters[-1].precision_bits[mnb_index] = E[ e_index % len(E)]   ~310

Fc = F
    Fc.parameters = altered_parameters return Fc
```

SYSTEM AND METHOD FOR WATERMARKING A MACHINE LEARNING MODEL

FIELD

The present disclosure relates to embedding information in a machine-learning model.

BACKGROUND

Machine learning models can be designed to process various types of data. In some implementations, a machine learning model can be trained to recognize or classify certain patterns in data. Machine learning models are trained using a known dataset. Based on the training, the model uses algorithms with mutable parameters to processes input data and can improve its processing success over time, using prior output or performance results to adjust its parameters.

Machine learning models include a function that consists of mathematical operations along with a set of parameters. The function uses the parameters to alter the mathematical operations' outputs as well as to alter the interactions between the function's mathematical operations and the inputs to the model. Each parameter (e.g., weights and biases) has a value expressible as a number formed of bits that affect model performance. The accuracy of a model is related in part to the number of bits associated with the precision of the individual parameters (e.g., mantissa bits for floating point representations) in the machine learning model. Changes in model performance can occur when one or more bits in a parameter are adjusted. However, certain bits in a parameter can be more or less impactful on model performance than others.

The research article "Identifying Important Nodes in Complex Networks Based on Multiattribute Evaluation" by Hui Xu et al., Mathematical Problems in Engineering, volume 2018, Article ID 8268436, 11 pages, https://doi.org/10.1155/2018/8268436, describes various techniques for identifying important nodes in machine learning models. The performance of a machine learning model is more sensitive to changes in the parameters of the important nodes.

Machine learning models are more frequently being integrated into consumer products to enhance both product performance and user experience. Currently, however, there is no effective method to digitally mark a machine learning model to identify its source or owner. A brute force method (e.g., trial and error) can be used to mark a machine learning model by changing the parameters of one or more nodes. However, such a process is not only inefficient, but can also lead to drastic changes and a degradation in model performance, if the parameters of an important node are modified. A process is needed which can identify important bits in node parameters so that a machine learning model can be digitally marked without affecting its performance or output.

SUMMARY

An exemplary method for embedding data into a machine learning model is disclosed, the method comprising: storing, in a memory device, program code for executing a machine learning model trained to perform a user-defined function; executing, by a processing device, the program code stored in the memory device to run the machine learning model, the machine learning model having one or more parameters where each parameter includes a value represented as a collection of bits; receiving, by a receiving device, a message to be embedded into the machine learning model; converting, by the processing device, the message into a binary representation; and embedding, by the processing device, the binary representation of the message into at least one of the one or more parameter values of the machine learning model, wherein the embedding modifies the at least one bit of the value of at least one of the one or more parameters.

A system for embedding data into a machine learning model is disclosed. The system comprising: a memory device that stores program code for executing a machine learning model trained to perform a user-defined function; a processing device configured to: execute the program code stored in the memory device to run the machine learning model, the machine learning model having one or more parameters where each parameter includes a value represented as a collection of bits; receive a message to be embedded into the machine learning model; encrypt the received message according to a cryptographic algorithm; convert the message into a corresponding binary representation; and embed the binary representation of the message into at least one of the one or more parameters of the machine learning model, wherein the embedding modifies the at least one bit of the value of at least one of the one or more parameters.

An exemplary computer-readable medium that stores program code for executing a machine learning model trained to perform a user-defined function is disclosed, the machine learning model having one or more parameters where each parameter includes a value represented as a collection of bits, and when the computer-readable medium is placed in communicable contact with a computer processor, the computer processor performs operations comprising: receiving a message to be embedded into one or more layers of the machine learning model; encrypting the received message according to a cryptographic algorithm; converting the message into a corresponding binary representation; and embedding the binary representation of the message into at least one of the one or more parameters of the machine learning model, wherein the embedding modifies the at least one parameter value.

BRIEF DESCRIPTION OF THE DRAWINGS

Exemplary embodiments are best understood from the following detailed description when read in conjunction with the accompanying drawings. Included in the drawings are the following FIGURES:

FIG. 3A illustrates a pseudo code for identifying the maximal non-interfering bit in machine learning model parameters in accordance with an exemplary embodiment of the present disclosure.

FIG. 3B illustrates pseudo code for embedding a message in machine learning model parameters in accordance with an exemplary embodiment of the present disclosure.

Further areas of applicability of the present disclosure will become apparent from the detailed description provided hereinafter. It should be understood that the detailed description of exemplary embodiments is intended for illustration purposes only and, therefore, is not intended to necessarily limit the scope of the disclosure.

DETAILED DESCRIPTION

Exemplary embodiments of the present disclosure utilize steganographic techniques to embed information into parameters of machine learning models while preserving the capability of the models to satisfactorily perform their user defined operations. These embeddings are referred to as "watermarks" throughout the present disclosure and can be used for a variety of purposes, such as but are not limited to, verifying the authenticity of a model or to provide metadata information about use rights or provenance.

Figure 1:
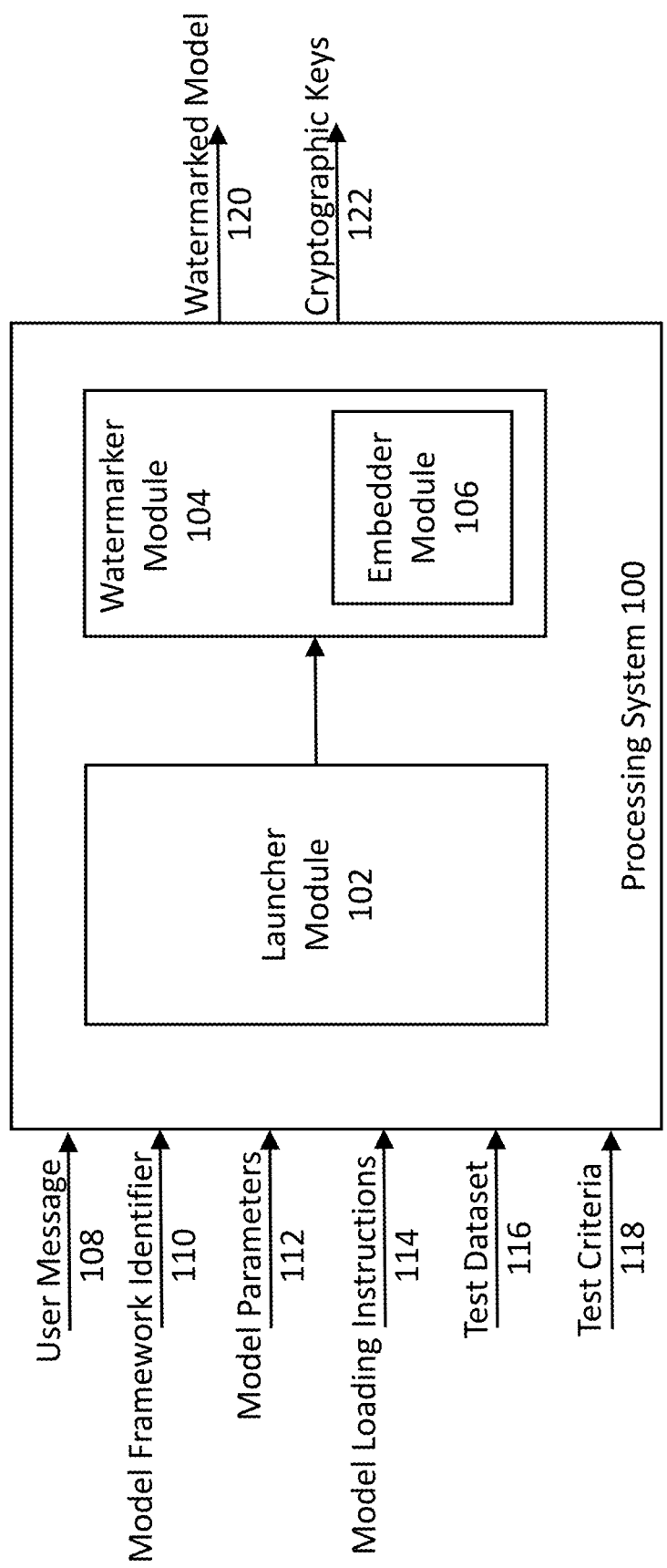
FIG. 1 illustrates a processing system for watermarking a machine-learning model in accordance with an exemplary embodiment of the present disclosure.

FIG. 1 illustrates an overview of a processing system 100 in accordance with an exemplary embodiment of the present disclosure. The processing system 100 can include a combination of hardware and software (e.g., program code) components for executing one or more machine learning models. For example, as discussed in detail in the portion of the disclosure related to FIG. 4, the processing system 100 can include, among other components, a memory device 402 and a processing device 408. The memory device 402 can store program code including one or more modules such as a launcher module 102, a watermarker module 104, and an embedder module 106. The memory device 402 can also include program code, data, and/or information for executing a machine learning model. According to exemplary embodiments of the present disclosure, the machine learning model is trained to perform a user-defined function and targeted for the embedding of a user-defined message.

As shown in FIG. 1, the processing system 100 can be configured to receive one or more inputs 108 to 118. The inputs can include Test Criteria 118, (e.g. Recall, Precision, F1 Score, and/or Bilingual Evaluation Understudy (BLEU) Score) which define desired performance metrics of the machine learning model, a user message 108 (e.g. text or binary) which defines the message to be embedded, a model framework identifier 110 which identifies how the processing system should interpret the model parameters file 112, model loading instructions 114 which are software code executed by the processing device during evaluation of test data 116 to identify model performance so that it can be compared against a test criteria 118 for the machine learning model. For example, the inputs can include at least a user message 108 to be embedded into the machine learning model, a model framework identifier 110, which defines the format and architecture of the machine learning model, model parameters 112 of the machine learning model, model loading instructions 114 for loading the machine learning model, a test dataset 116 for the machine learning model, and test criteria 118 for evaluating the machine learning model's performance during the embedding process. The processing system 100 can be configured to execute the program code for performing the operations of the launcher module 102 and use the input information such as, the model framework identifier 110, user instructions 114, and test dataset 116 to install a suitable base environment for executing the machine learning model. According to an exemplary embodiment, one or more of the input data can be provided as a filename or file path, which can be used to access the data at the identified storage location.

Figure 2A:
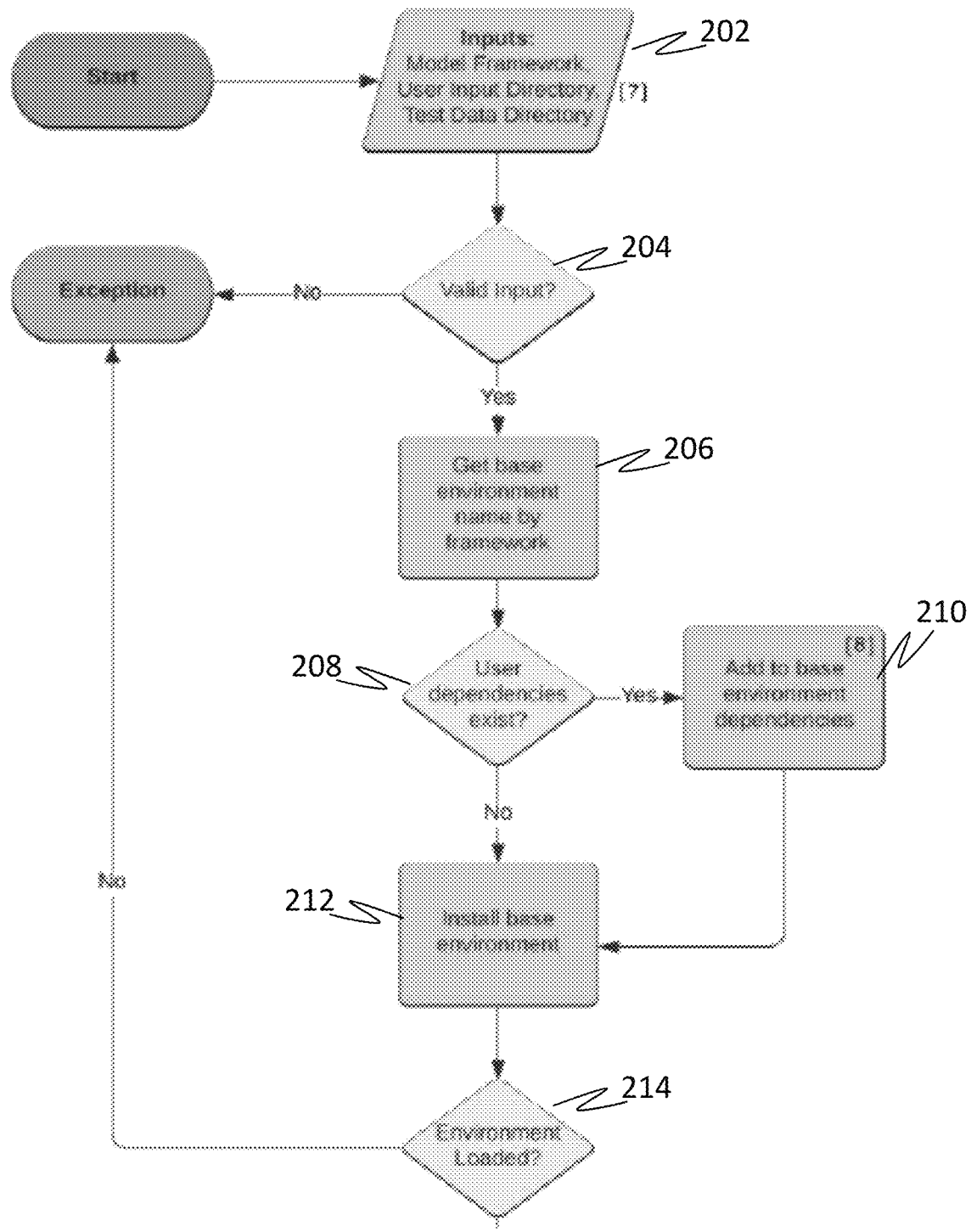
FIG. 2A illustrates a flow diagram for launching an environment for watermarking a machine-learning model in accordance with an exemplary embodiment of the present disclosure.

FIG. 2A illustrates a flow diagram for launching an environment for watermarking a machine-learning model in accordance with an exemplary embodiment of the present disclosure. In executing the launcher module 102, the processing system 100 can load user-provided data and code including a model parameters 112 file for the target model, program code defining the instructions, method, and requirements for loading the model parameters 112, a test dataset 116, and test criteria 118 (Step 202). The user-provided code can leverage a package (e.g., Tensorflow, Keras, PyTorch, Scikit Learn) identified through the model framework identifier 110 for establishing a machine learning environment for both executing the machine learning model and embedding the stored message into the model's parameters. According to an exemplary embodiment, the input data can include a requirements file that identifies user-specified software packages, software modules, and related dependencies for establishing the operating environment for the model framework. The requirements file can include a pointer to one or more memory locations or directories for accessing the packages for the model framework, the model parameters 112, the test data 116, the test criteria 118, and the user message 108. The launcher module 102 can access and/or download the input data from the memory location and determine whether the input data is valid. For example, the launcher module 102 can perform any known operations, methods, or techniques to evaluate, download, and/or verify the input data according to type, format, and structure. Once all components of the requirements file have been installed and validated by the launcher module 102, the processing system 100 executes the watermarker module 104.

Figure 2B:
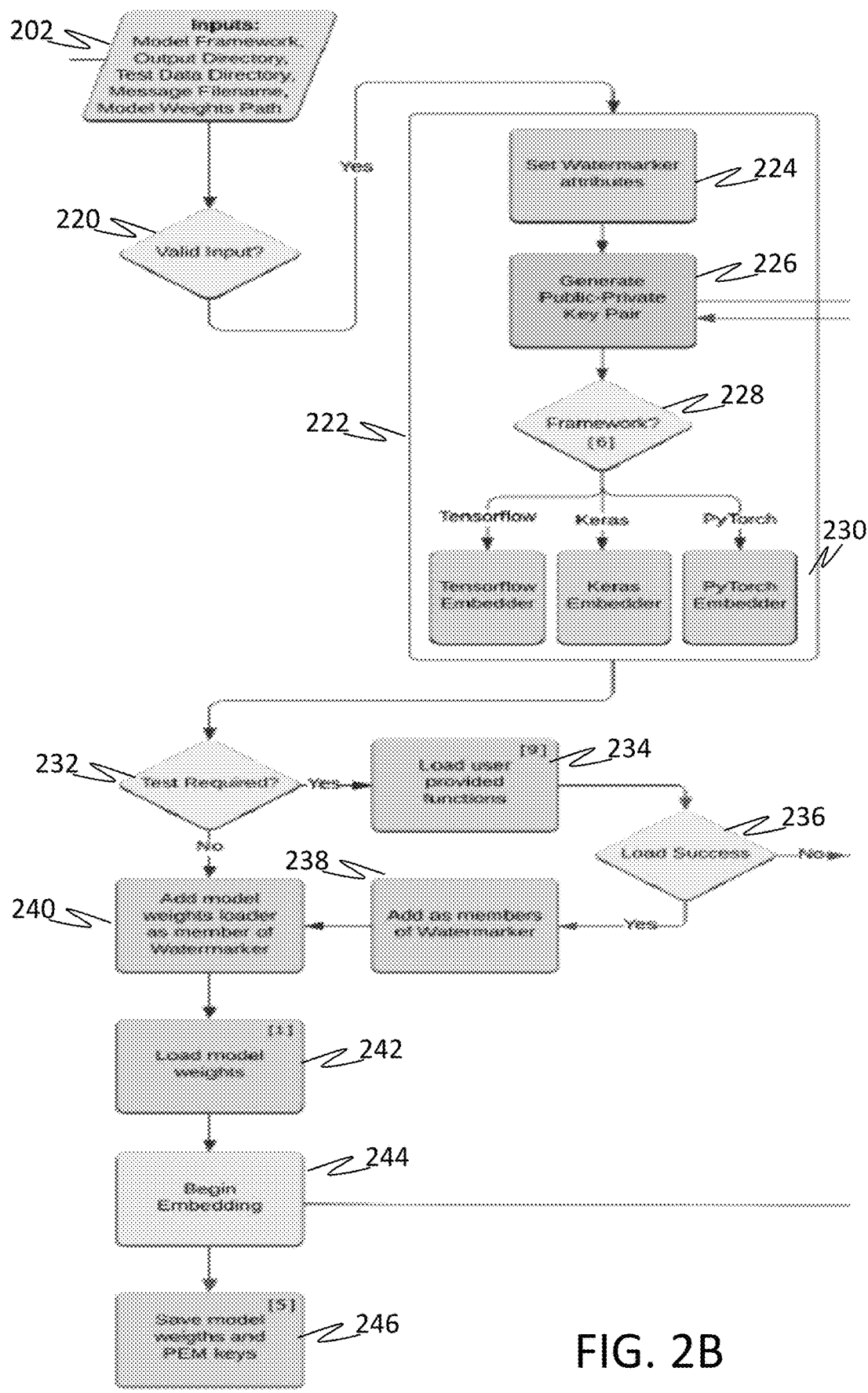
FIG. 2B illustrates a flow diagram for watermarking a machine-learning model in accordance with an exemplary embodiment of the present disclosure.

FIG. 2B illustrates a flow diagram for watermarking a machine-learning model in accordance with an exemplary embodiment of the present disclosure. The watermarker module 104 can access the user-provided data and code including a model parameters 112 file for the target model, program code defining the instructions, method, and requirements for loading the model parameters 114, a test dataset 116, and test criteria 118 obtained by the launcher module 102 (Step 202). According to an exemplary embodiment, the watermarker module 104 can perform a validation operation which evaluates and verifies the quality and/or format of the input data. This validation operation can be performed in addition to or as an alternative to the validation operation (Step 220) performed by the launcher module 102. Once the inputs are validated, the processing system 100 can use the input data to configure the processing environment of the watermarker module 104 (Step 222). This setup includes loading any necessary processing dependencies and configuring the processing environment (e.g., checking for necessary processing and storage components, testing processing and storage components, etc.) to carry out any user requested environment configuration testing. Optionally, a set of encryption keys can be generated to encrypt the user message 108 before embedding (Step 226). The encryption keys can be symmetric or asymmetric and can be generated according to any known cryptographic protocols or algorithms (e.g., Rivest-Shamir-Adleman (RSA), a digital signature algorithm (DSA), Data Encryption Standard (DES), Elliptic Curve Cryptography (ECC), Diffie-Hellman, Advanced Encryption System (AES), or other known techniques) as desired. If created, encryption keys are then loaded into memory 402. Additionally, the model framework for the embedding operation (Steps 228, 230) is loaded into memory 402. Once the processing environment has been configured, the watermarker module 104 can begin embedding the user message 108 into the machine learning model parameters 112. If test data 116 and test criteria 118 are provided (Step 232), user provided functions for testing are loaded (step 234) and added to the watermarker module (Step 238) upon successful loading (Step 236). The model weights provided as input by the user are then added to the watermarker module (Step 240). If test data 116 and test criteria are not provided, then only the model weights are added to the watermarker module (Step 240), and the model weights are loaded (Step 242) for embedding to begin (Step 244). According to an exemplary embodiment, any encryption keys can be stored in a file such as privacy-enhanced mail (PEM) file, or any other suitable file as desired (Step 246).

Figure 2C:
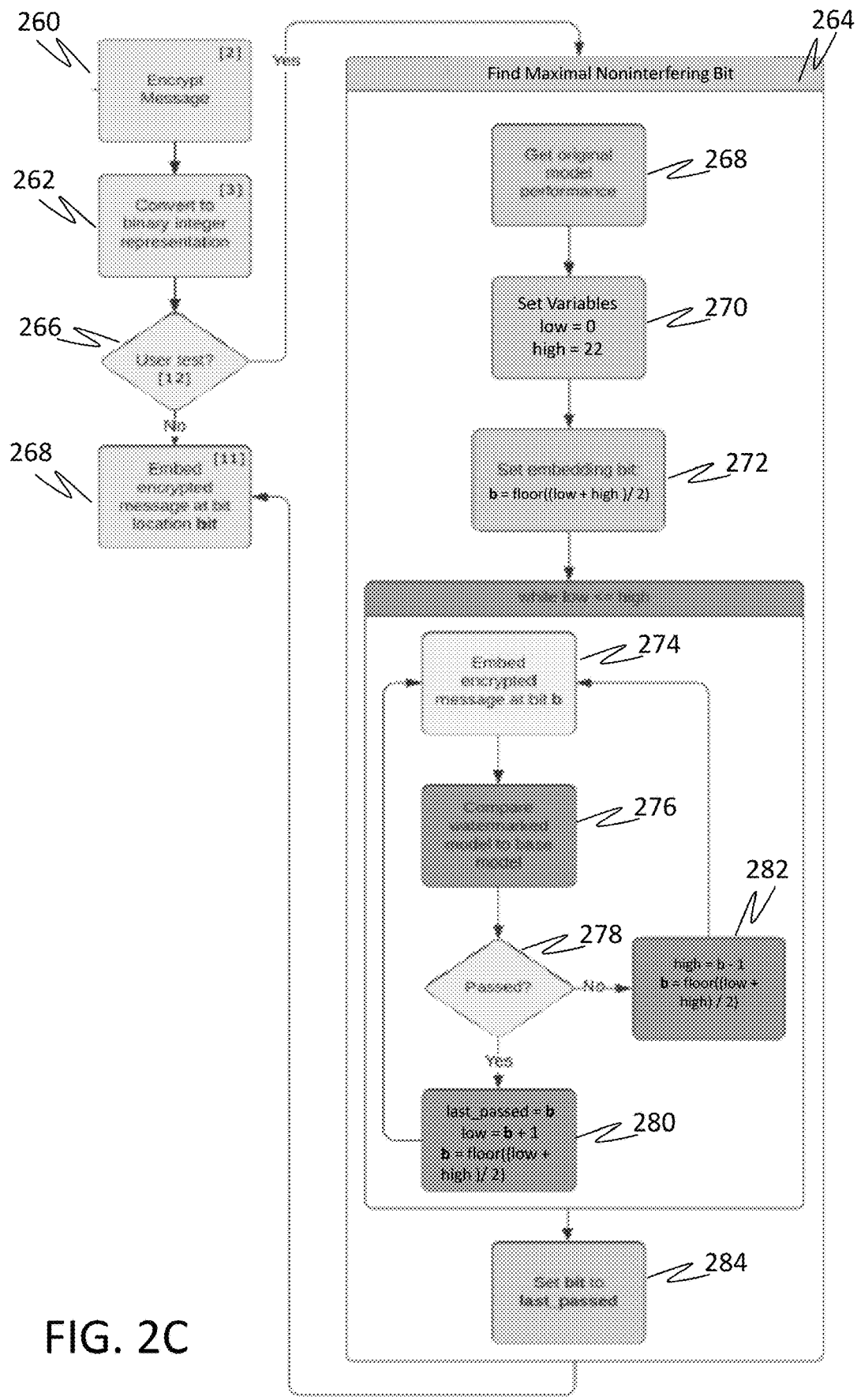
FIG. 2C illustrates a flow diagram for identifying a maximal non-interfering bit for embedding a message into a machine learning model in accordance with an exemplary embodiment of the present disclosure.

FIG. 2C illustrates a flow diagram for identifying a maximal non-interfering bit for embedding a message into a machine learning model in accordance with an exemplary embodiment of the present disclosure. According to an exemplary embodiment of the present disclosure, the operations shown in FIG. 2C are performed by the watermarker module 104. As shown in FIG. 1, the watermarker module 104 includes an encryption module 106, which obtains the user message 108 to be embedded from memory 402 and optionally encrypts the user message 108 (Step 260) using the set of encryption keys (Step 226, FIG. 2B) generated according to a specified cryptographic algorithm. The embedder module 106 then converts the binary representation of the encrypted message into a Boolean array (Step 262). For example, for an asymmetric encryption operation, the user message 108 is encrypted using the public key. Once the message is encrypted, the watermarker module 104 converts the encrypted message into a binary representation (i.e. a Boolean array) and embeds the binary representation of the encrypted message into at least a subset of the parameters of the machine learning model (Step 264). Under conditions in which test code and test criteria are not provided by the user (Step 266), during the embedding process, for each parameter of the machine learning model, the watermarker module 104 embeds a single bit of the binary representation of the encrypted message into a least significant bit controlling the precision of the parameter value (Step 268) (e.g., the least significant mantissa bit according to IEEE 754). Since the bits of the embedded message are spread among multiple parameters, multiple parameters must be decoded to retrieve the embedded message. Under conditions in which the user has provided test code and test criteria and this information is stored in memory 402, the watermarker module 104 executes a binary search leveraging bits controlling the precision of each parameter value to identify the bit index storing the bit representing the largest amount of change with which the model parameters 112 can be perturbed without affecting the output of the machine learning model beyond the test criteria. We refer to this bit index as the "maximal non-interfering bit index." For example, in a model that leverages floating point parameters, the watermarker module 104 can execute a binary search by leveraging the mantissa bits of each parameter value to identify the maximal non-interfering bit index. The watermarker module 104 would then use that bit index to embed the binary representation of the user message 108 across all the parameters in the model. As shown in FIG. 2C, the watermarker module 104 obtains the original model performance based on one or more output values of a previous model run (Step 268), sets the binary search range values (Step 270), and sets the initial current bit (i.e., b in step 272) equal to the low value plus a floor of the division by two of an absolute value of a difference between the low value and the high value (Step 272). When the low value parameter is lower than the high value parameter, the watermarker module 104 embeds the message at the current bit (Step 274). Using the test dataset 116 and test criteria 118, the watermarker module 104 compares the performance of the watermarked model (i.e., the model with the embedded message) to the performance of the original model to determine whether the watermarked model performance is acceptable (Step 276). If the watermarked model performance is acceptable (Step 278), the last passed bit is set equal to the current bit, and the low value of the bit index for the binary search range is set to exclude the possibility of selecting a bit controlling precision at a lower resolution than the current bit (Step 280). On the other hand, if the watermarked model performance is unacceptable, the high value of the bit index for the binary range search is set to exclude the possibility that the bits controlling precision resolution greater than the current bit are removed from consideration (Step 282). Once the maximal non-interfering bit is identified, the watermarker module 104 sets maximal non-interfering bit equal to the last passed bit (Step 284) and embeds the message at the location of the maximal non-interfering bit (Step 268).

FIG. 3A illustrates pseudo code for identifying a maximal non-interfering bit index for embedding a message into a machine learning model in accordance with an exemplary embodiment of the present disclosure. As shown, the function 300 receives inputs n, T, E, F, and test_data, where n=the number of bits used to control precision in the machine learning model; T=The test criteria 118 provided by the user; E=the user message 108 to embed in an indexable binary form (e.g. Boolean array); F=the machine learning model; and test_data=the test dataset 116 to use for computing test criteria compliance. The function 300 assumes, regardless of the number, the precision controlling bits (n) are aligned in descending order with the indexing scheme in ascending order thus the bit in index 0 has the coarsest resolution and the bit in index n−1 has the finest resolution. (e.g., if precision is controlled by 8 bits then a value of 1 in precision_bits[0]=$2^7$ and a value of 1 in precision_bits[7]= 1).

As illustrated in FIG. 3A, finding the maximal non-interfering bit is accomplished by performing a binary search over a series of performance evaluations related to perturbing the precision controlling bits of the model parameters. The code works in the following way: First, the maximal non-interfering bit (mnb) 302 is initialized to −1 indicating that no bit index has been found which meets the test criteria 118. Next, boundary values 304 for the binary search are established at the coarsest (L) and finest (R) resolutions of the precision controlling bits (n). Next, the binary search is started via a "while" loop 306 using standard binary search stopping criteria. In the while loop 306 a candidate bit index (c) is assigned to the midpoint of L and R. Next, an e_index variable 308 is created to govern the embedding of user message 108 into model parameter values. An empty list is also created to hold the altered_parameters. These altered_parameters 310 will correspond to model parameters that have had their precision bits altered. To create the altered_parameters 310 that will be evaluated in the current iteration of the while loop 306, a for loop 312 is defined which extracts the machine learning model's parameter values and parameter reference indices. For each iteration of the for loop 312, the altered_parameters list grows by appending a copy of the value of the current for loop iteration's model parameter to the end of the altered_parameters list. The altered_parameter list's newest addition is then altered by replacing the precision bit at index c with a bit from the embedded message at an index equal to e_index modded with E's length (i.e. the index is equal to the remainder of e_index divided by E's length). In this way, the user message 108 is embedded across the altered_parameters list multiple times with one bit being encoded in each member of the altered_parameters list. To finish the iteration processing, the for loop 312 randomizes the altered_parameters list's last parameter's value's bits with finer resolution than c and increases the e_index value so that a different bit from E will be embedded on the next iteration. Once the for loop 312 has completed its processing iterations, a copy of the model, Fc, is created and its model parameters are replaced by the altered_parameters 310 created by the for loop 312. The model Fc is then fed the test_data (i.e., test dataset 116) and a performance evaluation generates a metric that can be compared to T (i.e., test_criteria 118). If the performance evaluation resulted in a value that is acceptable given the user defined threshold metric then we know that the model can be adjusted at least at this precision bit. We therefore set the mnb_index 302 to c and ignore all precision bits (n) with a finer resolution by setting R=c−1. If the threshold fails to be satisfied, we know that changing the precision values by an amount more than the current bit allows would also fail to satisfy the threshold. As a result, we can ignore all the coarser bit indices by setting L=c+1. This process continues until the while loop 308 terminates. Whatever value the mnb_index 302 is set to at the termination of the while loop 306 is returned as the maximal non-interfering bit. If the test criteria 118 is never met during the performance evaluation, the value of −1 can be returned as an indication to abort the embedding process.

FIG. 3B illustrates pseudocode demonstrating one way a user message 108 can be embedded into a machine learning model's parameters in line with the present disclosure. The variables for the function have the same meanings as they do in FIG. 3A. The function 350 accepts the original model, F, the embedded message, E, and the maximal non-interfering bit index (mnb_index). The method then creates a set of altered parameter values 352 whose bit values are only guaranteed to be the same as the original model's bit values in the indices that control parameter value precision at a coarser level than the maximal non-interfering bit index. Once the altered values are created, a copy of the machine learning model, Fc, is created and the copy's parameter values are changed to the altered_parameter values. The altered machine learning model is then returned with the message embedded in it. This altered machine learning model we refer to as "watermarked."

When the embedding operation of a message is successful, the processing system 100 generates a new model weight file for the machine learning model by saving the new model parameters and any encryption keys necessary to decrypt the embedded message if the message is encrypted. For example, the new model parameter file can include parameter values which correspond to parameter values of the modified machine learning model at the test iteration when the index variable c equaled the eventual maximal non-interfering bit location. The processing system 100 can also generate a file or directory which identifies or defines one or more package parameters, instructions, policies, and/or properties of the environment used during the embedding operation. Furthermore, the processing system 100 can generate a script or program code for extracting the messages and decrypting encrypted messages with the private key and a suitable information theoretic algorithm. The environment file and the extraction script can be saved in memory 402 along with the new model parameters and the encryption keys if messages were encrypted. The processing system 100 extracts and decrypts the embedded message (if encrypted) from the new parameter values of the one or more parameters using the set of keys of the cryptographic algorithm.

Figure 4:
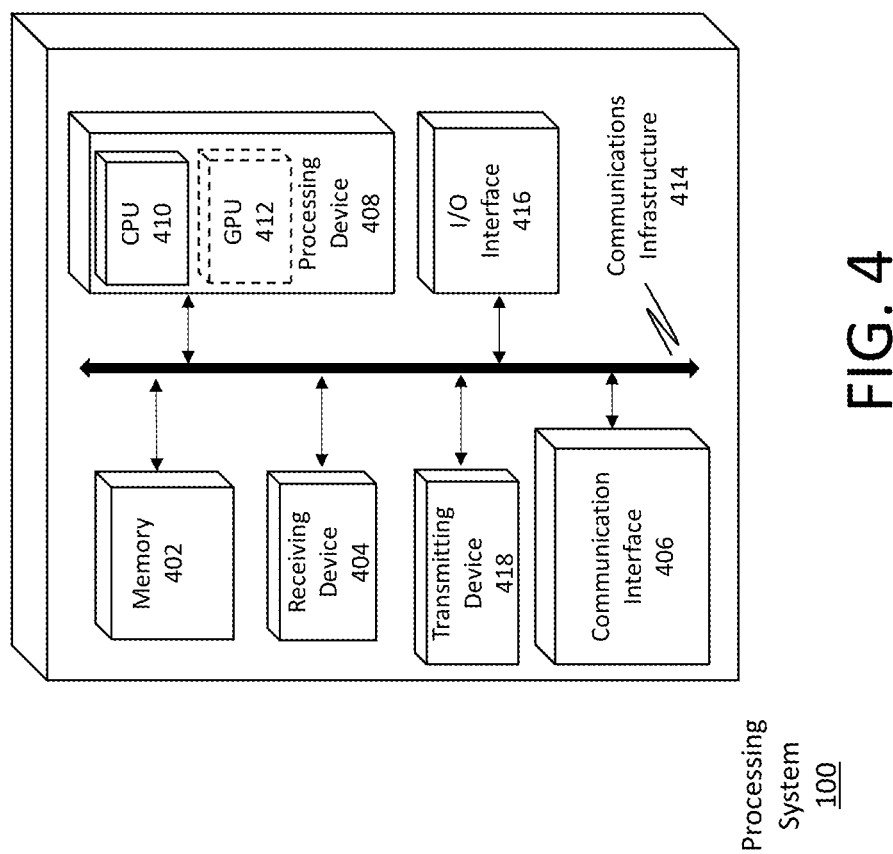
FIG. 4 illustrates a block diagram of a hardware configuration for watermarking machine learning models according to an exemplary embodiment of the present disclosure.

FIG. 4 illustrates a block diagram of a system for detecting drift according to an exemplary embodiment of the present disclosure.

As shown in FIG. 4, the system 100 can include memory 402, a receiving device 404, a communication interface 406, a processing device 408, a communication infrastructure 414, an input/output (I/O) interface 416, and a transmitting device 418.

The memory 402 can be configured for storing program code for at least one machine learning model. The memory 402 can include one or more memory devices such as volatile or non-volatile memory. For example, the volatile memory can include random access memory. According to exemplary embodiments, the non-volatile memory can include one or more resident hardware components such as a hard disk drive and a removable storage drive (e.g., a floppy disk drive, a magnetic tape drive, an optical disk drive, a flash memory, or any other suitable device). The non-volatile memory can include an external memory device connected to communicate with the system 100 via a network. According to an exemplary embodiment, an external memory device can be used in place of any resident memory devices. Data stored in system 100 may be stored on any type of suitable computer readable media, such as optical storage (e.g., a compact disc, digital versatile disc, Blu-ray disc, etc.) or magnetic tape storage (e.g., a hard disk drive). The stored data can include image data, control data, and/or system data generated and/or accessed by the processing device 408, and software or program code used by the processing device 408 for performing the tasks associated with the exemplary embodiments described herein. The data may be configured in any type of suitable database configuration, such as a relational database, a structured query language (SQL) database, a distributed database, an object database, etc. Suitable configurations and storage types will be apparent to persons having skill in the relevant art.

The receiving device 404 may be a combination of hardware and software components configured to receive the training dataset and a test dataset. According to exemplary embodiments, the receiving device 404 can include a hardware component such as an antenna, a network interface (e.g., an Ethernet card), a communications port, a PCMCIA slot and card, or any other suitable component or device as desired. The receiving device 404 can be an input device for receiving signals and/or data packets encoded with image data from another device, such as a database, image sensor, image processor or other suitable device as desired. The receiving device 404 can be connected to other devices via a wired or wireless network or via a wired or wireless direct link or peer-to-peer connection without an intermediate device or access point. The hardware and software components of the receiving device 404 can be configured to receive image data according to one or more communication protocols and data formats. For example, the receiving device 404 can be configured to communicate over a network, which may include a local area network (LAN), a wide area network (WAN), a wireless network (e.g., Wi-Fi), a mobile communication network, a satellite network, the Internet, fiber optic cable, coaxial cable, infrared, radio frequency (RF), another suitable communication medium as desired, or any combination thereof. During a receive operation, the receiving device 404 can be configured to identify parts of the received data via a header and parse the data signal and/or data packet into small frames (e.g., bytes, words) or segments for further processing at the processing device 408.

The processing device 408 can be configured for executing the program code stored in memory 402. Upon execution, the program code causes the processing device 408 to implement a machine-learning model in the form of a deep learning neural network having a plurality of intermediate layers. The processing device 408 can be a special purpose or a general purpose processing device encoded with program code or software for performing the exemplary functions and/or features disclosed herein. According to exemplary embodiments of the present disclosure, the processing device can include a central processing unit (CPU) 410 and/or a graphics processing unit (GPU) 412. The CPU 410 can be connected to the communications infrastructure 414 including a bus, message queue, or network, multi-core message-passing scheme, for communicating with other components of the system 100, such as the memory 402, input device 404, the communications interface 406, and the I/O interface 416. The CPU 410 can include one or more processing devices such as a microprocessor, microcomputer, programmable logic unit or any other suitable hardware processing devices as desired. According to exemplary embodiments, the GPU 412 can include a combination of hardware and software components, such as a special purpose hardware processing device being configured to execute or access program code or software for rendering images in a frame buffer for display. For example, the GPU 412 can include an arithmetic logic unit, on-chip memory, and be configured with an application program interface such as Vulkan®, OpenGL ES (Open Graphics Library for Embedded Systems), OpenVG (OpenVector Graphics), OpenCL (Open Computing Language), OpenGL (Open Graphics Library), Direct3D, CUDA® or any other suitable hardware and/or software platform as desired.

The I/O interface 416 can be configured to receive the signal from the processing device 408 and generate an output suitable for a peripheral device via a direct wired or wireless link. The I/O interface 416 can include a combination of hardware and software for example, a processor, circuit card, or any other suitable hardware device encoded with program code, software, and/or firmware for communicating with a peripheral device such as a display device, printer, audio output device, or other suitable electronic device or output type as desired.

The transmitting device 418 can be configured to receive data from the processing device 408 and assemble the data into a data signal and/or data packets according to the specified communication protocol and data format of a peripheral device or remote device to which the data is to be sent. The transmitting device 418 can include any one or more of hardware and software components for generating and communicating the data signal over the communications infrastructure 414 and/or via a direct wired or wireless link to a peripheral or remote device. The transmitting device 418 can be configured to transmit information according to one or more communication protocols and data formats as discussed in connection with the receiving device 404.

The computer program code for performing the specialized functions described herein can be stored on a non-transitory computer usable medium, such as the memory devices for the system 100 (e.g., computing device), which may be memory semiconductors (e.g., DRAMs, etc.) or other tangible non-transitory means for providing software to the system 100. The computer programs (e.g., computer control logic) or software may be stored in a memory device 402 resident on/in the system 100 (e.g., a computing device). The computer programs may also be received via a communications interface. Such computer programs, when executed, may enable the system 100 to implement the present methods and exemplary embodiments discussed herein. Accordingly, such computer programs may represent controllers of the system 100. Where the present disclosure is implemented using software, the software may be stored in a computer program product or non-transitory computer readable medium and loaded into the system 100 using a removable storage drive, an interface, a hard disk drive, or communications interface 406, where applicable.

The processing device 408 can include one or more modules or engines configured to perform the functions of the exemplary embodiments described herein. Each of the modules or engines may be implemented using hardware and, in some instances, may also utilize software, such as corresponding to program code and/or programs stored in memory 402. In such instances, program code may be interpreted or compiled by the respective processors (e.g., by a compiling module or engine) prior to execution. For example, the program code may be source code written in a programming language that is translated into a lower level language, such as assembly language or machine code, for execution by the one or more processors and/or any additional hardware components. The process of compiling may include the use of lexical analysis, preprocessing, parsing, semantic analysis, syntax-directed translation, code generation, code optimization, and any other techniques that may be suitable for translation of program code into a lower level language suitable for controlling the system 100 to perform the functions disclosed herein. It will be apparent to persons having skill in the relevant art that such processes result in the system 100 being a specially configured computing device uniquely programmed to perform the functions of the exemplary embodiments described herein.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A method for embedding data into a machine learning model, the method comprising:
   storing, in a memory device, program code for executing a machine learning model trained to perform a user-defined function;
   executing, by a processing device, the program code stored in the memory device to run the machine learning model, the machine learning model having one or more parameters where each parameter includes a value represented as a collection of bits;
   receiving, by a receiving device, a message to be embedded into the machine learning model;
   converting, by the processing device, the message into a binary representation;

embedding, by the processing device, the binary representation of the message into at least one of the one or more parameter values of the machine learning model, wherein the embedding modifies at least one non-interfering bit of the value of at least one of the one or more parameters;

encrypting, by the processing device, the received message;

receiving, by the receiving device, a test dataset, first data which define desired performance metrics of the machine learning model, second data which define the message to be embedded, and third data which are software code executed by the processing device to evaluate the performance metrics for the machine learning model;

executing a binary search on bits controlling the precision of each parameter value to identify the precision-controlling bit index representing the greatest amount of precision that can be altered without affecting the performance of the machine learning model to a greater extent than a predetermined acceptable tolerance, the binary search including the steps of:

initializing a first variable to a low value to represent the index value of the least significant bit controlling the precision of the parameter value and initializing a second variable to a high value to represent the index value of the most significant bit controlling the precision of the parameter value;

calculating a current bit index based on the low value and a difference between the low value and a high value;

modifying the one or more parameter values of the machine learning model by embedding a bit of the encrypted message into a current bit identified by the current bit index controlling the precision of the parameter and replacing any remaining less significant bits with random bit values; and evaluating the performance of the machine learning model with the modified parameters against the test dataset by determining whether the performance of the modified machine learning model is within the predetermined acceptable tolerance as defined by the first data.

2. The method of claim 1, wherein encrypting the received message comprises:
generating, by the processing device, a set of keys for use with a cryptographic algorithm; and
encrypting the received message using the set of keys during execution of the cryptographic algorithm.

3. The method of claim 2, wherein embedding the binary representation of the encrypted message comprises:
for each parameter value of the machine learning model, embedding a single bit of the binary representation of the encrypted message into a least significant bit controlling the precision of the parameter value.

4. The method of claim 2, wherein embedding the binary representation of the encrypted message comprises:
for each parameter value of the machine learning model, embedding a single bit of the binary representation of the encrypted message into each model parameter to create an altered model parameter, the altered model parameter having at least one modified bit of the value of at least one of the one or more parameters.

5. The method of claim 1, comprising:
storing, by the memory device, the test dataset, the first data, the second data, and the third data.

6. The method of claim 1, wherein
the current bit index is calculated based on an initial current bit equal to the low value plus a floor of the division by two of an absolute value of the difference between the low value and the high value, wherein the current bit index is a parameter value where a bit of the binary representation of the encrypted message is to be embedded during a first iteration of the binary search, the method further comprising:
(a) setting a maximal non-interfering bit index equal to the current bit index if the machine learning model performance is determined to be within the predetermined acceptable tolerance;
(b) changing either the low value or high value in accordance with a binary search algorithm, and setting the current bit index to equal the low value plus a floor of the division by two of the absolute value of the difference of the low value and the high value, this current bit index being the bit at which the binary representation of the encrypted message will be embedded during the next iteration of the binary search algorithm;
(c) restoring the modified parameter values to their original values; and
(d) repeating the step of modifying the one or more parameter values of the machine learning model and steps (a)-(c) until the high value is less than or equal to the low value, determining whether user-provided test criteria cannot be met, and displaying an error message when the user-provided test criteria is not achievable, or selecting the current bit index as the maximal non-interfering bit index if the user-provided test criteria is achievable.

7. The method of claim 6, further comprising:
generating a new model parameter file for the machine learning model, the new model parameter file including parameter values for the modified one or more parameters of the machine learning model as they existed during the iteration of the binary search that identified the maximal non-interfering bit index.

8. The method of claim 7, further comprising:
extracting and decrypting the embedded message from the new parameter values from the new model parameters file using the set of keys of the cryptographic algorithm.

9. The method of claim 1, wherein receiving the message to be embedded comprises:
encrypting, by the processing device, the received message according to a cryptographic algorithm.

10. A system for embedding data into a machine learning model, the system comprising:
a memory device that stores program code for executing a machine learning model trained to perform a user-defined function;
a processing device configured to:
execute the program code stored in the memory device to run the machine learning model, the machine learning model having one or more parameters where each parameter includes a value represented as a collection of bits;
receive a message to be embedded into the machine learning model;
encrypt the received message according to a cryptographic algorithm;
convert the message into a corresponding binary representation;
embed the binary representation of the message into at least one of the one or more parameters of the machine learning model, wherein the embedding modifies at least one non-interfering bit of the value of at least one of the one or more parameters;

encrypt the received message;

receive user-provided test criteria, first data which define desired performance metrics of the machine learning model, second data which define the message to be embedded, and third data which are software code executed by the processing device to evaluate the performance metrics for the machine learning model;

execute a binary search on bits controlling the precision of each parameter value to identify the precision-controlling bit index representing the greatest amount of precision that can be altered without affecting the performance of the machine learning model to a greater extent than a predetermined acceptable tolerance, the processor being configured to:

initialize a first variable to a low value to represent the index value of the least significant bit controlling the precision of the parameter value and initializing a second variable to a high value to represent the index value of the most significant bit controlling the precision of the parameter value;

calculate a current bit index based on the low value and a difference between the low value and a high value;

modify the one or more parameter values of the machine learning model by embedding a bit of the encrypted message into a current bit identified by the current bit index controlling the precision of the parameter and replacing any remaining less significant bits with random bit values; and evaluate the performance of the machine learning model with the modified parameters against the test dataset by determining whether the performance of the modified machine learning model is within the predetermined acceptable tolerance as defined by the first data.

11. The system of claim 10, wherein to encrypt the received message, the processing device is further configured to:

generate a set of keys for use with a cryptographic algorithm; and encrypt the received message using the set of keys during execution of the cryptographic algorithm.

12. The system of claim 11, wherein to embed the binary representation of the encrypted message, the processing device is further configured to:

for each parameter value of the machine learning model, embed a bit of the binary representation of the encrypted message into a least significant bit controlling a precision of the parameter value.

13. The system of claim 11, wherein to embed the binary representation of the encrypted message, the processor is further configured to:

for each parameter value of the machine learning model, embed a single bit of the binary representation of the encrypted message into each model parameter having at least one modified bit of the value of at least one of the one or more parameters.

14. The system of claim 10, wherein the current bit index is a parameter value where a bit of the binary representation of the encrypted message is to be embedded during a first iteration of the binary search the processor being further configured to:

(a) set a current maximal non-interfering variable equal to the current bit index if the machine learning model performance is determined to be within the predetermined acceptable tolerance as defined by the first data;

(b) change either the low value or high value in accordance with a binary search algorithm, and set the current bit index to equal the low value plus a floor of the division by two of the absolute value of the difference of the low value and the high value, this current bit index being the bit at which the binary representation of the encrypted message will be embedded during the next iteration of the binary search algorithm;

(c) restore the modified parameter values to their original values; and (d) repeat the step to modify the one or more parameter values of the machine learning model and steps (a)-(c) until the high value is less than or equal to the low value, determining whether user-provided test criteria cannot be met, displaying an error message when the user-provided test criteria is not achievable, selecting the current bit index as the maximal non-interfering bit index if the user-provided test criteria is achievable.

15. The system of claim 14, wherein the processing device is configured to:

generate a new model parameter file for the machine learning model, the new model parameter file including parameter values for the modified one or more parameters of the machine learning model as they existed during the iteration of the binary search that identified the maximal non-interfering bit index.

16. The system of claim 15, wherein the processing device is further configured to:

extract the embedded message from the new parameter values from the new model parameters file; and decrypt the extracted message using the set of keys of the cryptographic algorithm.

17. The system of claim 10, wherein to embed the binary representation of the encrypted message, the processor is further configured to:

for each parameter value of the machine learning model, embed a single bit of the binary representation of the encrypted message into a least significant bit controlling the precision of the parameter value.

18. A non-transitory computer-readable medium that stores program code for executing a machine learning model trained to perform a user-defined function, the machine learning model having one or more parameters where each parameter includes a value represented as a collection of bits, and when the computer-readable medium is placed in communicable contact with a computer processor, the computer processor performs operations comprising:

receiving a message to be embedded into of the machine learning model;

encrypting the received message according to a cryptographic algorithm; converting the message into a corresponding binary representation; and embedding the binary representation of the message into at least one of the one or more parameters of the machine learning model, wherein the embedding modifies non-interfering bits of the at least one parameter value;

receiving a test dataset, first data which define desired performance metrics of the machine learning model, second data which define the message to be embedded, and third data which are software code executed by the processing device to evaluate the performance metrics for the machine learning model;

executing a binary search on bits controlling the precision of each parameter value to identify the precision-controlling bit index representing the greatest amount of precision that can be altered without affecting the performance of the machine learning model to a greater extent than a predetermined acceptable tolerance, the binary search including the steps of:

initializing a first variable to a low value to represent the index value of the least significant bit controlling the precision of the parameter value and initializing a second variable to a high value to represent the index value of the most significant bit controlling the precision of the parameter value;

calculating a current bit index based on the low value and a difference between the low value and a high value;

modifying the one or more parameter values of the machine learning model by embedding a bit of the encrypted message into a current bit identified by the current bit index controlling the precision of the parameter and replacing any remaining less significant bits with random bit values; and evaluating the performance of the machine learning model with the modified parameters against the test dataset by determining whether the performance of the modified machine learning model is within the predetermined acceptable tolerance as defined by the first data.

* * * * *